(12) United States Patent
Boyd et al.

(10) Patent No.: US 10,204,039 B2
(45) Date of Patent: Feb. 12, 2019

(54) HOST CONTROLLED HYBRID STORAGE DEVICE

(71) Applicant: Intel Corporation, Santa Clara, CA (US)

(72) Inventors: James A. Boyd, Hillsboro, OR (US); Dale J. Juenemann, North Plains, OR (US); Francis R. Corrado, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 68 days.

(21) Appl. No.: 15/004,162

(22) Filed: Jan. 22, 2016

(65) Prior Publication Data

US 2016/0217069 A1   Jul. 28, 2016

Related U.S. Application Data (63) Continuation of application No. 13/993,170, filed as application No. PCT/US2011/055622 on Oct. 10, 2011, now Pat. No. 9,244,848.

(51) Int. Cl.
*G06F 12/02* (2006.01)
*G06F 12/0868* (2016.01)
*G06F 12/0804* (2016.01)
*G06F 12/12* (2016.01)

(52) U.S. Cl.
CPC ...... *G06F 12/0246* (2013.01); *G06F 12/0804* (2013.01); *G06F 12/0868* (2013.01); *G06F 12/12* (2013.01); *G06F 2212/205* (2013.01); *G06F 2212/217* (2013.01); *G06F 2212/222* (2013.01); *G06F 2212/60* (2013.01)

(58) Field of Classification Search
CPC ............. G06F 12/0246; G06F 12/0804; G06F 12/0868; G06F 12/0871; G06F 12/12; G06F 12/126; G06F 2212/205; G06F 2212/217; G06F 2212/222; G06F 2212/60; G06F 2212/69
USPC ................................. 711/103, 113, 118, 138
See application file for complete search history.

(56) References Cited

U.S. PATENT DOCUMENTS

| | | | |
|---|---|---|---|
| 7,308,531 B2 | 12/2007 | Coulson | |
| 7,472,219 B2 | 12/2008 | Tamura et al. | |
| 2002/0194440 A1 | 12/2002 | Ghosh et al. | |
| 2004/0225835 A1 | 11/2004 | Coulson | |
| 2007/0019315 A1 | 1/2007 | Tamura et al. | |
| 2007/0186039 A1 | 8/2007 | Nam | |
| 2008/0086599 A1* | 4/2008 | Maron | G06F 12/126 711/133 |
| 2011/0145489 A1 | 6/2011 | Yu et al. | |

(Continued)

FOREIGN PATENT DOCUMENTS

WO    2013055312 A1    4/2013

OTHER PUBLICATIONS

PCT International Search Report and Written Opinion issued in corresponding PCT/US2011/055622 dated May 24, 2012 (12 pages).

(Continued)

*Primary Examiner* — Gary J Portka
(74) *Attorney, Agent, or Firm* — Compass IP Law PC (57) ABSTRACT

A host based caching technique may be used to determine caching policies for a hybrid hard disk drive. Because the host based caching may make use of knowledge about what data is being cached, improved performance may be achieved in some cases.

33 Claims, 5 Drawing Sheets

(56) References Cited

U.S. PATENT DOCUMENTS

2013/0179624 A1    7/2013   Lambert et al.
2014/0013053 A1*   1/2014   Sawin ................. G06F 12/0873
                                                      711/122
2014/0215137 A1    7/2014   Bondurant et al.

OTHER PUBLICATIONS

Internatonal Preliminary Report on Patentability, PCT/US2011/055622, dated May 24, 2012, 5 pages.
Notice of Allowance for U.S. Appl. No. 13/933,170, dated Sep. 25, 2015, 5 pages.
Office Action for U.S. Appl. No. 13/933,170, dated May 21, 2015, 7 pages.

\* cited by examiner

HOST CONTROLLED HYBRID STORAGE DEVICE

CROSS-REFERENCE TO RELATED APPLICATIONS

This is a continuation application based on non-provisional application Ser. No. 13/993,170 filed on Jun. 11, 2013, hereby expressly incorporated by reference herein.

BACKGROUND

This relates generally to controlling storage devices for processor-based systems.

Some storage devices have relatively fast access times and lower storage capacities, while other storage devices have slower access time and higher storage capacities. Since sometimes fast access is needed and other times large storage capacity is needed, it is advantageous to have one storage device that has both capabilities. Hybrid hard disks combine a small portion of solid state media and less expensive magnetic based media in one integrated unit. However, the performance of these devices may be limited. It would be advantageous to provide combined storage devices that have better performance.

DETAILED DESCRIPTION

The performance of hybrid hard disks may be limited to the effectiveness of logical block address only based caching because the device only has knowledge of the logical block addresses and no additional information, such as priority of the request or file system information. However, host software based non-volatile storage input/output caching techniques have knowledge of input/output priority, file types, process information, and other data to determine caching policies, and use this enhanced information together with discrete hard disk and solid state cache devices.

For current designs, with different types of memory in the same package, there is no method for passing enhanced information to the solid state cache media. Instead, only the host system software or drivers has access to this "extra data". In some embodiments, the host software drivers may use this richer information to control the various media types of a hybrid storage device. A hybrid storage device may include NAND flash memory, a future high speed non-volatile memory type, and/or a magnetic memory, to mention a few examples. In some cases, power savings and/or performance advantages may be achieved.

Figure 1:
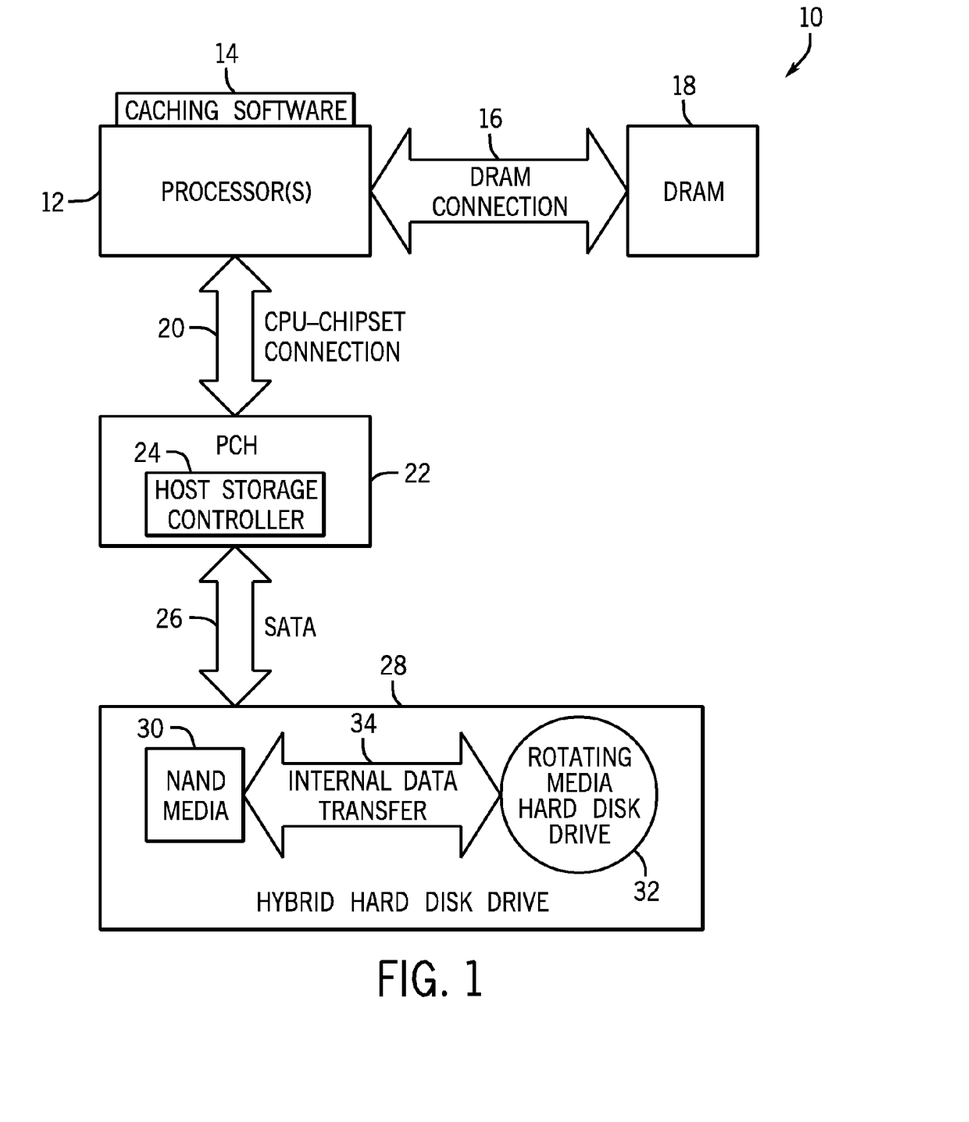
FIG. 1 is a schematic depiction of one embodiment of the present invention.

Referring to FIG. 1, in accordance with one embodiment, a host system 10 may include one or more processors 12 coupled over a suitable connection 16 to a system memory 18, including dynamic random access memory (DRAM). Caching software 14 may be executed by the processors 12. The processors 12, in one embodiment, may be coupled by a connection 20 to a chipset, including a peripheral component hub (PCH) 22. The peripheral component hub 22 may include a host storage controller 24. The architecture shown in FIG. 1 is only one example of a system architecture.

The host storage controller 24 may be coupled by a bus, such as a Serial Advanced Technology Attachment (SATA) bus 26 to a hybrid hard disk drive 28. The hybrid hard disk drive may be one package that includes a phase change memory and/or a NAND flash media 30, coupled over an internal data transfer bus 34 to a rotating media hard disk drive 32. Other combinations of semiconductor and magnetic memory may also be used.

In some embodiments, the drive 28 may be a processor or controller based system capable of executing instructions.

The hybrid hard disk drive is plugged into the host chipset over an interface, such as SATA, that may be controlled, in one embodiment by Intel's Smart Response Technology software, acting as the caching software 14. The software 14 uses host based caching mechanisms to direct system input/output to various physical media regions on the hybrid hard disk drive 28.

Most frequently used data may be directed and stored on the fastest media portion of the hybrid hard disk drive, which acts as a cache for the slower storage. If one of the storages becomes filled, the software 14 instructs the hybrid hard disk drive to move data from one region to another, via internal instructions, in order to avoid host memory movement, in some embodiments. The host software 14 can provide a better caching solution than a hard disk drive that does not have real time host knowledge and the richness of information needed to effectively control the two types of media within the storage device.

Particularly, relying on logical block addressing only based information and making cache insertion and eviction decisions based upon this limited data and simple algorithms, such as least recently used algorithms, can result in cache thrashing. In cache thrashing, lower priority data evicts higher priority data and/or reduced performance may result. By providing more information, this type of thrashing or performance hit can be lessened.

In another embodiment, physically separate devices, such as the devices 30 and 32, may be used. When the two devices are physically separate, the host software has the ability to directly control the content of cache with advanced algorithms, making use of rich information. However, two physically separate devices may take on additional complexity of handling the physical separation and necessary data synchronization.

By providing information about file types and process priority, the host can make decisions based on which logical addresses are touched. This more informed decision can lead to increased performance in some embodiments.

Allowing the host to control the mechanisms that place data either in the faster solid state media area or the magnetic slower media area of a hybrid storage device may lead to better performance and lower power consumption in some cases. This is because the host may be aware of the additional information associated with inputs/outputs destined for the device and can make more intelligent caching decisions as a result. Thus, the host can control the placement of incoming input and output data within the storage.

In some embodiments, the hybrid hard disk drive 28 directly exposes the total media size and region information to the host for all media types. Then the host can directly access the multimedia type areas on the disk via standard command sets. Each media type area is a continuous logical address subset of the total logical address range exposed to the host in one embodiment.

Alternately, in some embodiments, the host may issue negative logical block addresses of the magnetic or slower media area as an explicit indication that the request is to be cached in the fast solid state media area. The incoming logical block address from the host request is sign inverted and sent to the device 28. As another example, a separate indicator in the command may denote a cache this request or a do not cache this request. The negative logical block address region in the fast media may have a one-to-one relationship with the slower media backing storage region. In this way, the faster media region can serve as a write-back cache for the slower media.

The drive 28 may also accept a command that moves data between the various media types within the drive itself, thereby saving data movement to and from the host. In some embodiments, a mechanism to flush all data from one media type area to the magnetic or slower media type area can be provided. This mechanism may be manually invoked by software, but may also be invoked by the device automatically during initialization when connected to a system that does not have the caching software 14. In this way, the storage device presents the latest copy of data to the system, whether or not the caching software is present. An initiation command received from the host during initial device enumeration indicates the host intends to explicitly manage the media area types and prevents the global flush from occurring. The device may be configured to automatically flush if this initiation command is not received from the host within a certain period of time upon power-up. As another example, automatic flush may occur if the first command after power up is something other than the initiation command.

Figure 2:
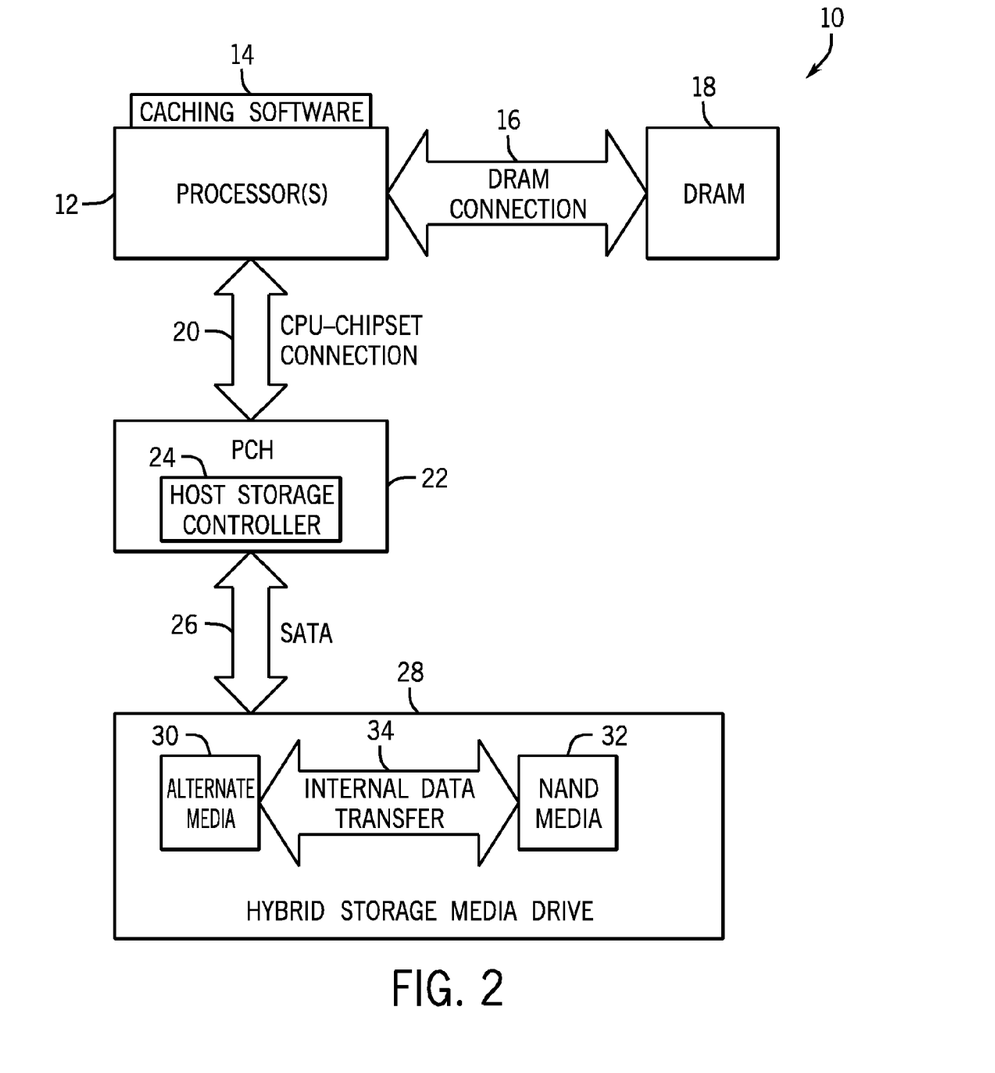
FIG. 2 is a schematic depiction of another embodiment of the present invention.

Another embodiment, shown in FIG. 2, differs in that the hybrid storage device 28 includes only solid state media, such as a future high speed non-volatile memory type 30 and NAND media 32.

Figure 3:
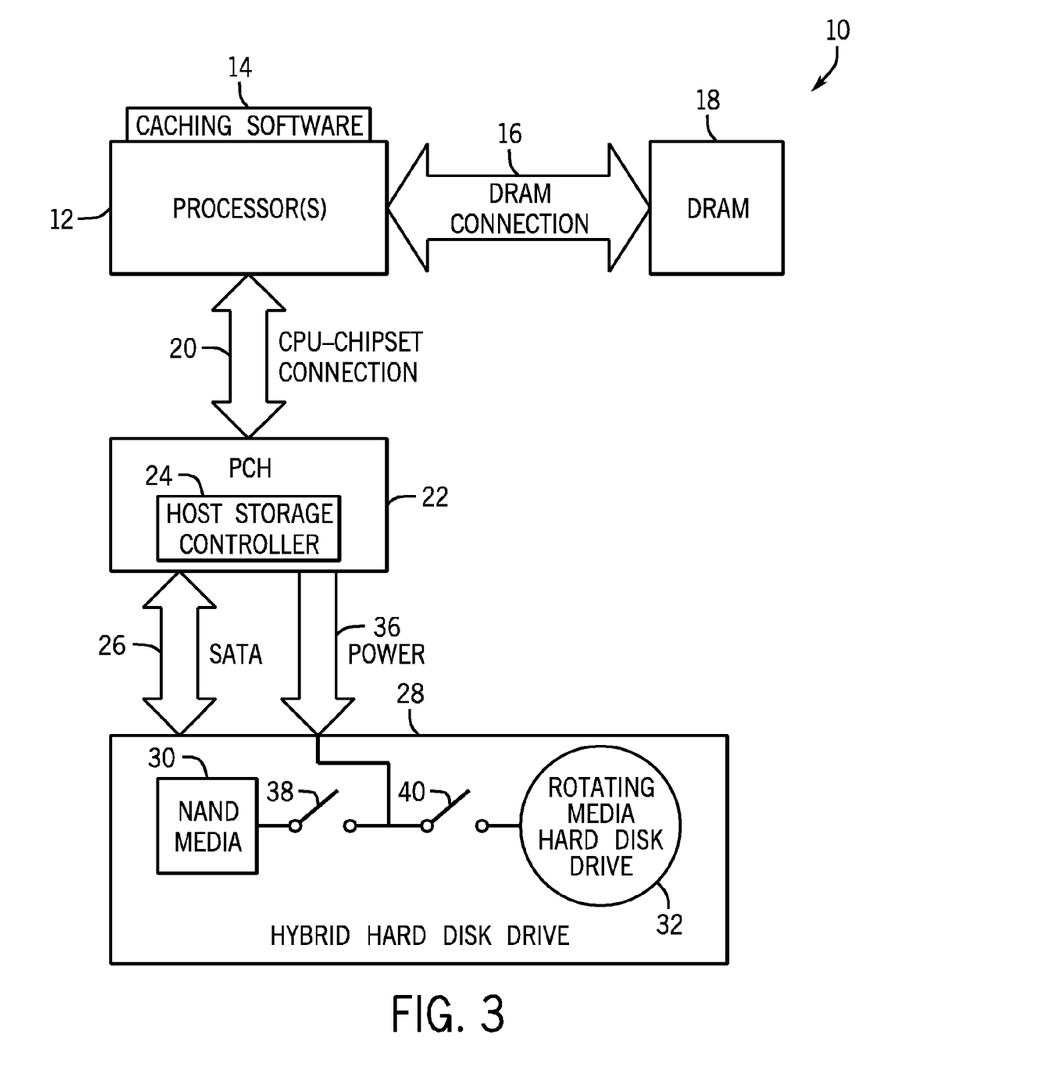
FIG. 3 is a schematic depiction of another embodiment of the present invention.

The embodiment of FIG. 3 differs in that a separate power line 36 is provided to the hybrid hard disk drive 28. In addition, the hybrid hard disk drive 28 has switches 38 and 40 for cutting power to the media 30 and/or the media 32.

Figure 4:
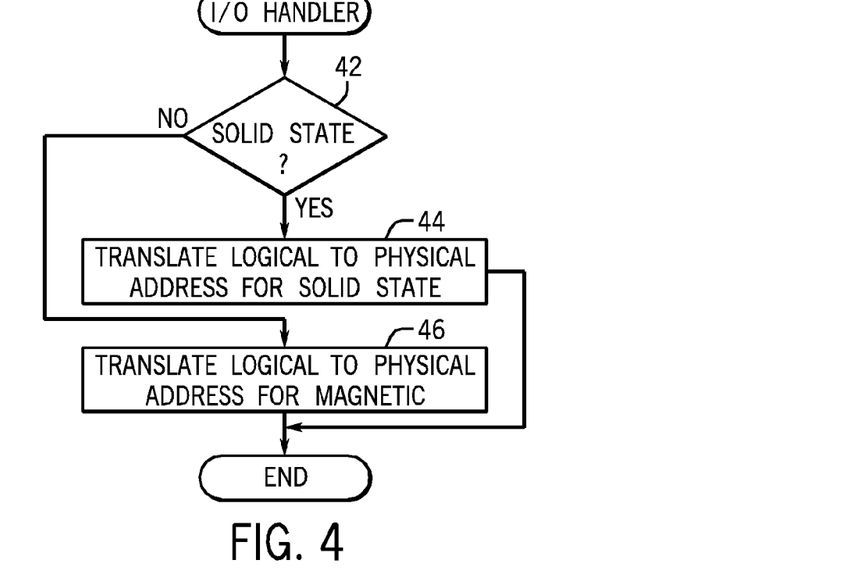
FIG. 4 is a flow chart for one embodiment of the present invention.

Referring to FIG. 4, the input/output handler may be implemented in software, hardware, and/or firmware. In software and firmware embodiments, the sequence may be implemented by computer executed instructions stored in a non-transitory computer readable medium, such as a semiconductor, magnetic, or optical storage. For example, the sequence of FIG. 4 could be stored as part of the caching software 14 in the system memory 18, in one embodiment.

Initially, a check at diamond 42 determines whether an access is to the solid state region. If so, the logical to physical addresses are translated for the solid state device, as indicated in block 44. Otherwise, the logical to physical addresses are translated for the magnetic or second storage device, as indicated in block 46.

Figure 5:
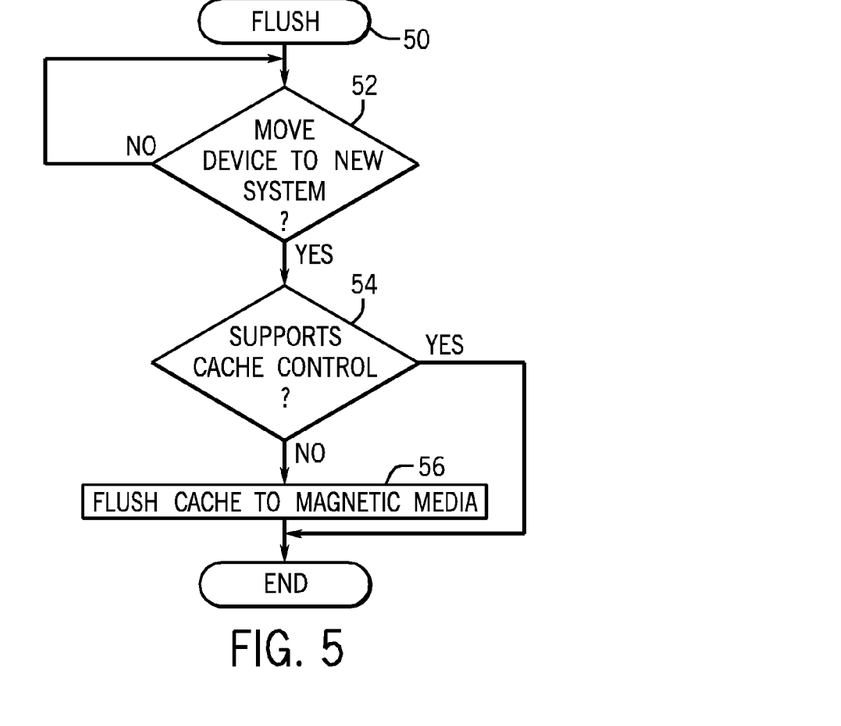
FIG. 5 is a flow chart for another embodiment of the present invention.

Referring next to FIG. 5, the flush sequence 50 may be implemented in hardware, software, and/or firmware. In software and firmware embodiments, the sequence may be implemented in computer executed instructions stored in a non-transitory computer readable medium, such as an optical, magnetic, or semiconductor storage. In one embodiment, the sequence of FIG. 5 may be part of a caching software 14 that may, for example, be stored in the system memory 18. In another embodiment, the sequence 50 may be implemented by the drive 28 itself.

A check at diamond 52 determines whether the device 28 has been moved to a new system. If the device 28 has been moved to a new system, a check at diamond 54 determines whether it supports cache control from the host of the two different types of storage. If so, the flow continues. Otherwise, the cache may be flushed to magnetic media, as determined in block 56.

Figure 6:
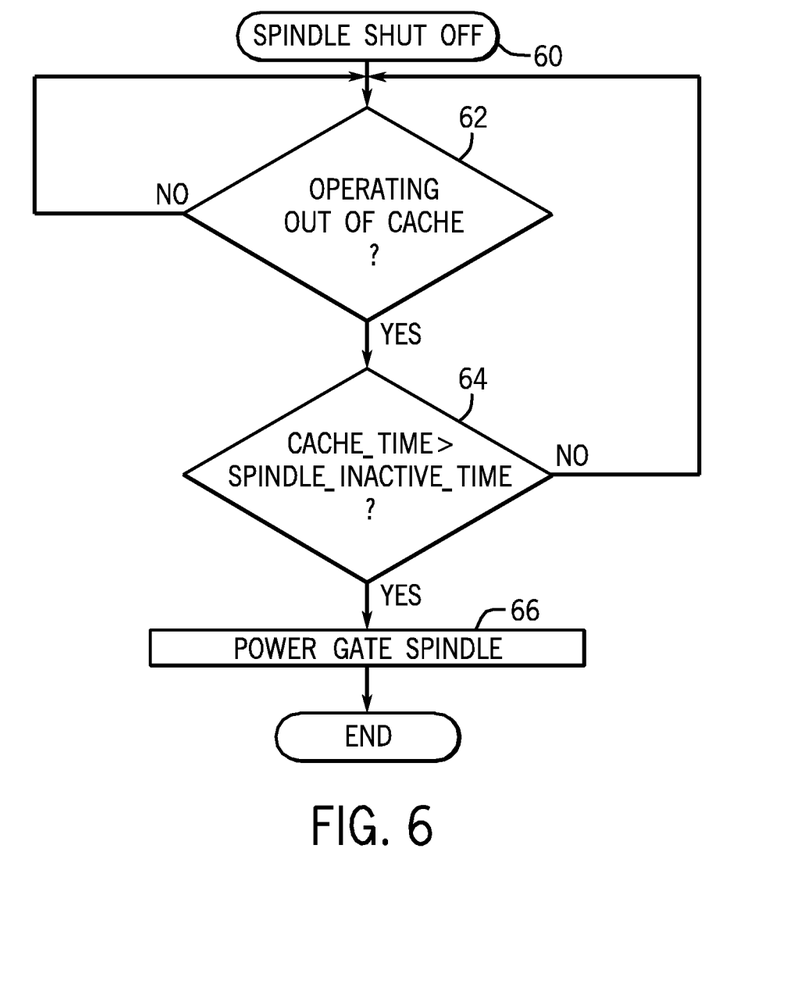
FIG. 6 is a flow chart for still another embodiment of the present invention.

Moving to FIG. 6, a spindle shutoff sequence 60 may be used to reduce power consumption, in some embodiments. The sequence may be implemented in hardware, software, and/or firmware. In software and firmware embodiments, the sequence may be implemented by computer executed instructions stored in a non-transitory computer readable medium, such as an optical, magnetic, or semiconductor storage. In one embodiment, the sequence 60 may be part of the caching software 14 stored in the system memory 18. In another embodiment, the sequence 60 may be implemented by the drive 28 itself.

A check at diamond 62 determines whether the system is operating out of the cache. If so, a check at diamond 64 determines whether the variable CacheTime, which represents the amount of time it has been operating out of the cache, is greater than a variable spindle inactive timer, which gives a threshold value for when the timer should be shut off. If CacheTime is greater than this threshold value, as determined in diamond 64, power to the spindle may be gated (block 66), for example using the switch 40, shown in FIG. 3.

Software pseudo code for one embodiment is as follows:

```
// host software incoming I/O handler
// support for negative LBA caching on Hybrid Device
if (hostCachingPolicy(cmd) == solidState) {
    // 2s complement LBA and issue IO so it goes to NAND
    LBA = -LBA;
    // issue IO
    issueIO(cmd, LBA);
} else if (hostCachingPolicy(cmd) == magneticMedia) {
    // issue normally to backing store
    issueIO(cmd, LBA);
}
```

Or

```
// host software incoming I/O handler
// support for managing differing media areas
if (hostCachingPolicy(cmd) == solidState) {
    // translate the logical to physical address for the device's solid
    state area
    LBA = L2P(solidStateArea);
    // issue IO
    issueIO(cmd, LBA);
} else if (hostCachingPolicy(cmd)== magneticMedia) {
    // translate the logical to physical address for the device's magnetic
    area
    LBA = L2P(magneticArea);
    // issueIO
    issueIO(cmd, LBA);
}
```

Flushing Code:

```
// if the user wants to move this device to a system that does
not support host controlled
// Hybrid mechanisms then the solid state area should be
flushed to the backing store
```

-continued

```
// i.e. magnetic media
if (driverWillBeMoved( ) == TRUE) {
    issueIO(flushSolidStateArea, NULL);
}
```

Initialization Code:

```
// If the host supports explicit control of the Hybrid mechanisms, then
send the "Init"
// command to prevent automatic flushing
if (driverSupportsExplicitCacheControl( ) == TRUE) {
    issueIO(initCommand, NULL);
}
Moving data from one media type area to another
if (evictData == TRUE) {
    // evict data from solid state area to backing store (i.e. magnetic
    media)
    // moves data from negative LBA to real LBA on backing store
    issueIO(moveData, -LBA);
} else if (populateData == TRUE) {
    // populate data to solid state area from backing store (i.e. magnetic
    media)
    issueIo(moveData, LBA);
}
```

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A solid state hybrid device (SSHD), comprising:
   a non-volatile storage device; and
   a non-volatile cache medium coupled to the non-volatile storage device, the non-volatile cache medium to selectively cache data;
   wherein the SSHD is to make determinations, separate from a determination made by a host, to selectively cache data based at least in part on frequency of access in addition to information from host to indicate a caching priority of logical block addresses (LBAs) associated with a request from the host to store data in the SSHD, wherein the caching priority is to indicate high priority, intermediate priority, or non-priority, where in response to a high priority indication the SSHD is to store data in the non-volatile cache medium until receipt of an eviction request for the data, and in response to the intermediate priority the SSHD is to select between the non-volatile storage device and the non-volatile cache medium.

2. The SSHD of claim 1, wherein the non-volatile storage device comprises a rotating magnetic memory.

3. The SSHD of claim 1, wherein the SSHD is to selectively cache data further based at least in part on information from the host, the information to indicate a file type of a request from the host.

4. The SSHD of claim 1, wherein the SSHD is to selectively cache data further based at least in part on an explicit indication from the host to cache specific LBAs.

5. The SSHD of claim 1, wherein the SSHD is to selectively cache data further based at least in part on information at the SSHD related to access frequency to the LBAs.

6. The SSHD of claim 1, further comprising the SSHD to provide caching feedback information to the host.

7. The SSHD of claim 6, wherein the caching feedback information comprises storage region information.

8. The SSHD of claim 1, further comprising the non-volatile cache medium to transfer data to the non-volatile storage device in response to an indication from the host to flush data from cache.

9. The SSHD of claim 1, wherein the non-volatile cache medium comprises flash memory.

10. A system comprising:
    a solid state hybrid device (SSHD) including
        a non-volatile storage device; and
        a non-volatile cache medium coupled to the non-volatile storage device, the non-volatile cache medium to selectively cache data; and
    a host including logic to provide information to the SSHD to indicate a caching priority of logical block addresses (LBAs) associated with a request to store data in the SSHD;
    wherein the SSHD is to make determinations to selectively cache data based at least in part on frequency of access and the information from the host, wherein the caching priority is to indicate high priority, intermediate priority, or non-priority, where in response to a high priority indication the SSHD is to store data in the non-volatile cache medium until receipt of an eviction request for the data, and in response to the intermediate priority the SSHD is to select between the non-volatile storage device and the non-volatile cache medium.

11. The system of claim 10, wherein the non-volatile storage device comprises a rotating magnetic memory.

12. The system of claim 10, wherein the host is to indicate a file type of a request.

13. The system of claim 10, wherein the host is to provide an explicit indication to cache specific LBAs.

14. The system of claim 10, further comprising the SSHD to provide information to the host to indicate region information for the non-volatile cache medium.

15. The system of claim 10, further comprising the non-volatile cache medium to transfer data to the non-volatile storage device in response to an indication from the host to flush data from cache.

16. The system of claim 10, the host further comprising one or more of
    at least one processor communicatively coupled to the SSHD to access data of the SSHD;
    a network adapter communicatively coupled to at least one processor; or
    a display communicatively coupled to at least one processor.

17. A host computing device, comprising:
    a processor to generate a request to store data on a solid state hybrid device (SSHD), the SSHD to include a non-volatile storage device and a non-volatile cache medium; and
    a storage controller to interface with the SSHD when coupled to the SSHD, wherein the processor to provide information to indicate a caching priority of logical block addresses (LBAs) associated with the request, and wherein the SSHD to make determinations to selectively cache LBAs associated with the request in the non-volatile cache medium based at least in part on frequency of access and the information, wherein the caching priority is to indicate high priority, intermediate priority, or non-priority, where in response to a high priority indication the SSHD is to store data in the non-volatile cache medium until receipt of an eviction request for the data, and in response to the intermediate priority the SSHD is to select between the non-volatile storage device and the non-volatile cache medium.

18. The host computing device of claim 17, wherein the processor to further indicate a file type for the request.

19. The host computing device of claim 17, wherein the processor to further provide an explicit indication to cache specific LBAs.

20. The host computing device of claim 17, further comprising the processor to receive caching feedback information from the SSHD.

21. A method comprising:
generating a request to write data to a solid state hybrid device (SSHD), wherein the SSHD includes a non-volatile storage device, and a non-volatile cache medium coupled to the non-volatile storage device to selectively cache data; and
sending the request with caching information to the SSHD to cause the SSHD to make determinations to selectively cache data in the non-volatile cache medium based at least in part on frequency of access and the caching information, the caching information including a caching priority of logical block addresses (LBAs) associated with the request, the caching priority to indicate high priority, intermediate priority, or non-priority, where in response to a high priority indication the SSHD is to store data in the non-volatile cache medium until receipt of an eviction request for the data, and in response to the intermediate priority the SSHD is to select between the non-volatile storage device and the non-volatile cache medium.

22. The method of claim 21, wherein sending the request with caching information further comprises sending file type information for the request.

23. The method of claim 21, wherein sending the caching information further comprises sending an explicit indication to cache specified LBAs.

24. The method of claim 21, further comprising receiving caching feedback from the SSHD.

25. The method of claim 21, further comprising sending an indication to flush data from cache to cause the SSHD to transfer data from the non-volatile cache medium to the non-volatile storage device.

26. A method comprising:
receiving, at a solid state hybrid device (SSHD), a request to write data from a host, and receiving, at the SSHD, caching information associated with the request, wherein the SSHD includes a non-volatile storage device, and a non-volatile cache medium coupled to the non-volatile storage device; and
making determinations to selectively cache data in the non-volatile cache medium in response to receiving the request, based at least in part on frequency of access and the caching information including a caching priority of logical block addresses (LBAs) associated with the request, wherein the caching priority is to indicate high priority, intermediate priority, or non-priority, where in response to a high priority indication the SSHD is to store data in the non-volatile cache medium until receipt of an eviction request for the data, and in response to the intermediate priority the SSHD is to select between the non-volatile storage device and the non-volatile cache medium.

27. The method of claim 26, wherein the non-volatile storage device comprises a rotating magnetic memory.

28. The method of claim 26, wherein receiving the request and the caching information further comprises receiving file type information for the request.

29. The method of claim 26, wherein receiving the caching information further comprises receiving an explicit indication to cache specified LBAs.

30. The method of claim 26, further comprising sending caching feedback to the host.

31. The method of claim 26, further comprising
receiving an indication to flush data from cache; and
in response to receiving the indication, transferring data from the non-volatile cache medium to the non-volatile storage device.

32. The SSHD of claim 1, further comprising the host, the host including logic to provide information to the SSHD to indicate a caching priority of LBAs associated with a request to store data in the SSHD.

33. The SSHD of claim 1, wherein the non-volatile storage device comprises NAND storage media, and the non-volatile cache medium comprise a non-NAND non-volatile storage medium.

* * * * *